(12) United States Patent
Tang et al.

(10) Patent No.: US 7,231,084 B2
(45) Date of Patent: Jun. 12, 2007

(54) COLOR DATA IMAGE ACQUISTION AND PROCESSING

(75) Inventors: Bei Tang, Schaumburg, IL (US); Robert M. Dyas, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 1048 days.

(21) Appl. No.: 10/259,362

(22) Filed: Sep. 27, 2002

(65) Prior Publication Data

US 2004/0061902 A1 Apr. 1, 2004

(51) Int. Cl.
*G06K 9/00* (2006.01)
(52) U.S. Cl. ...................... 382/162; 382/167
(58) Field of Classification Search ............... 382/162, 382/166, 167, 262, 300; 348/273; 358/519
See application file for complete search history.

(56) References Cited

U.S. PATENT DOCUMENTS

| | | | |
|---|---|---|---|
| 4,724,395 A | 2/1988 | Freeman | 327/93 |
| 5,909,254 A | 6/1999 | Feig et al. | 348/660 |
| 6,392,699 B1 * | 5/2002 | Acharya | 382/162 |
| 6,791,609 B2 * | 9/2004 | Yamauchi et al. | 348/273 |
| 7,002,627 B1 * | 2/2006 | Raffy et al. | 348/273 |

FOREIGN PATENT DOCUMENTS

EP 1050847 A2 11/2000

* cited by examiner

*Primary Examiner*—Phuoc Tran

(57) ABSTRACT

A method and structure for implementing color image acquisition and processing. Combined and direct interpolation and conversion from a first to a second color space of sensor color data provided to a device capable of receiving and displaying color image data, followed by color correction in the second color space, greatly simplifies acquisition and processing of color image data. Interpolation in the combined interpolation and conversion can optionally be vertex-based interpolation in which color data for virtual pixels for one or more pixels of interest can occur in parallel fashion. Conversion in the combined interpolation and conversion can be performed in accordance with a simplified conversion matrix that does not require the use of multiplier logic to be implemented but that does require compensation during subsequent color correction of the color data, also in the second color space. Vertex-based interpolation may additionally be performed in an image acquisition and processing process that does not combine interpolation with conversion of color image data.

25 Claims, 14 Drawing Sheets

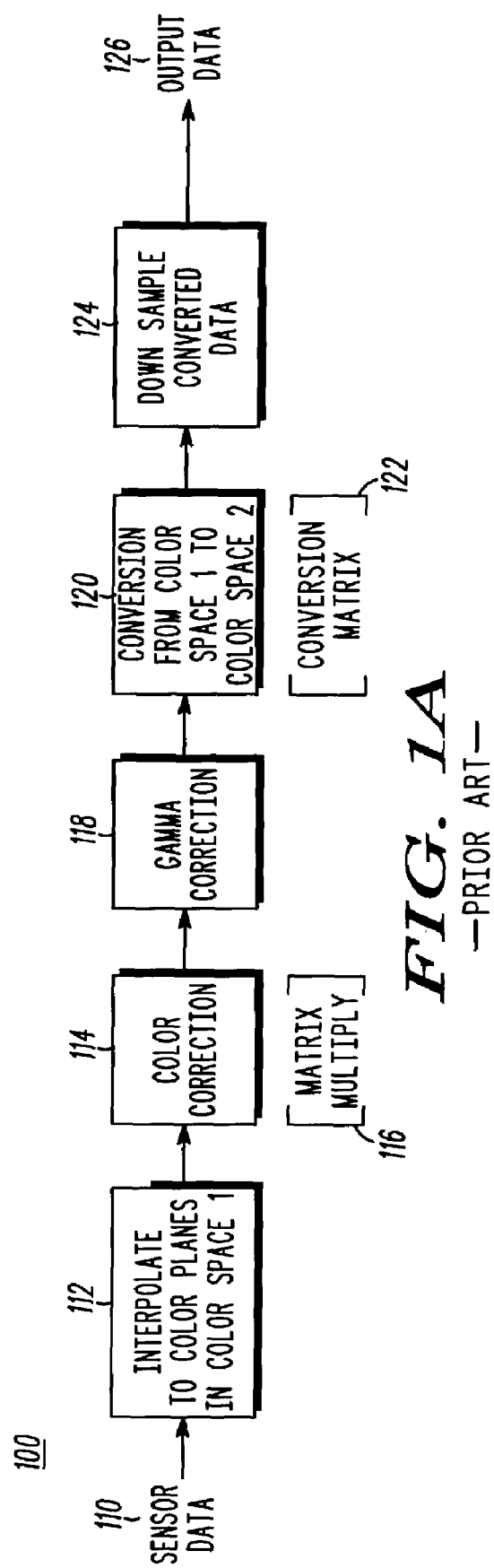
FIG. 1A —PRIOR ART—

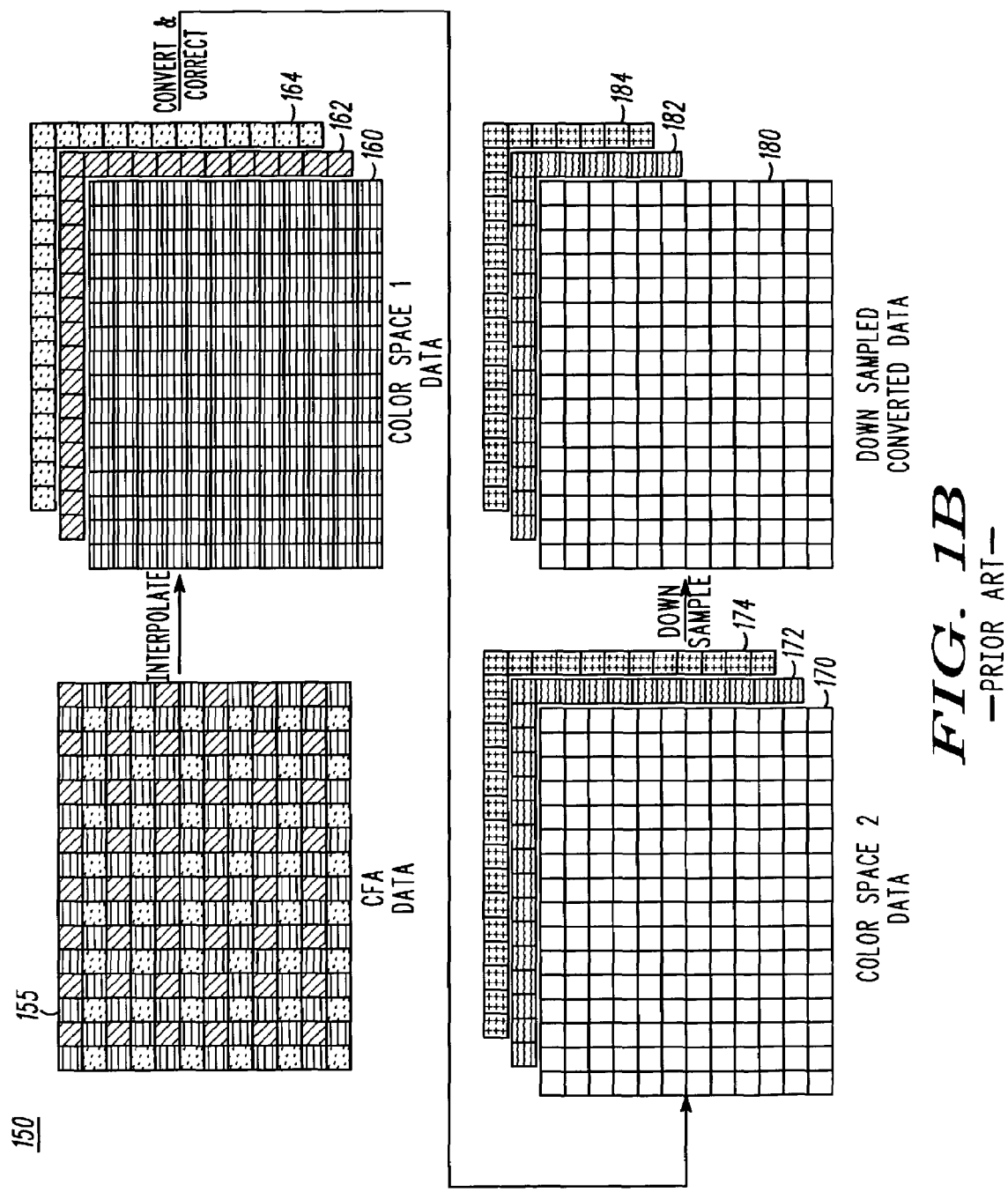
FIG. 1B —PRIOR ART—

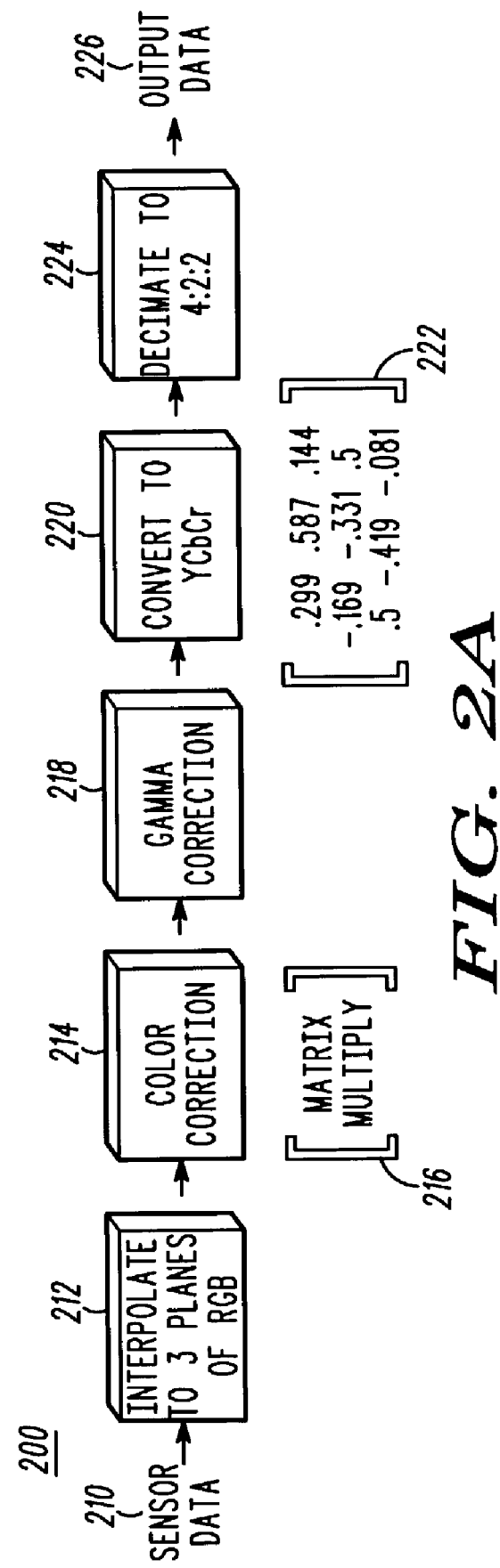
FIG. 2A —PRIOR ART—

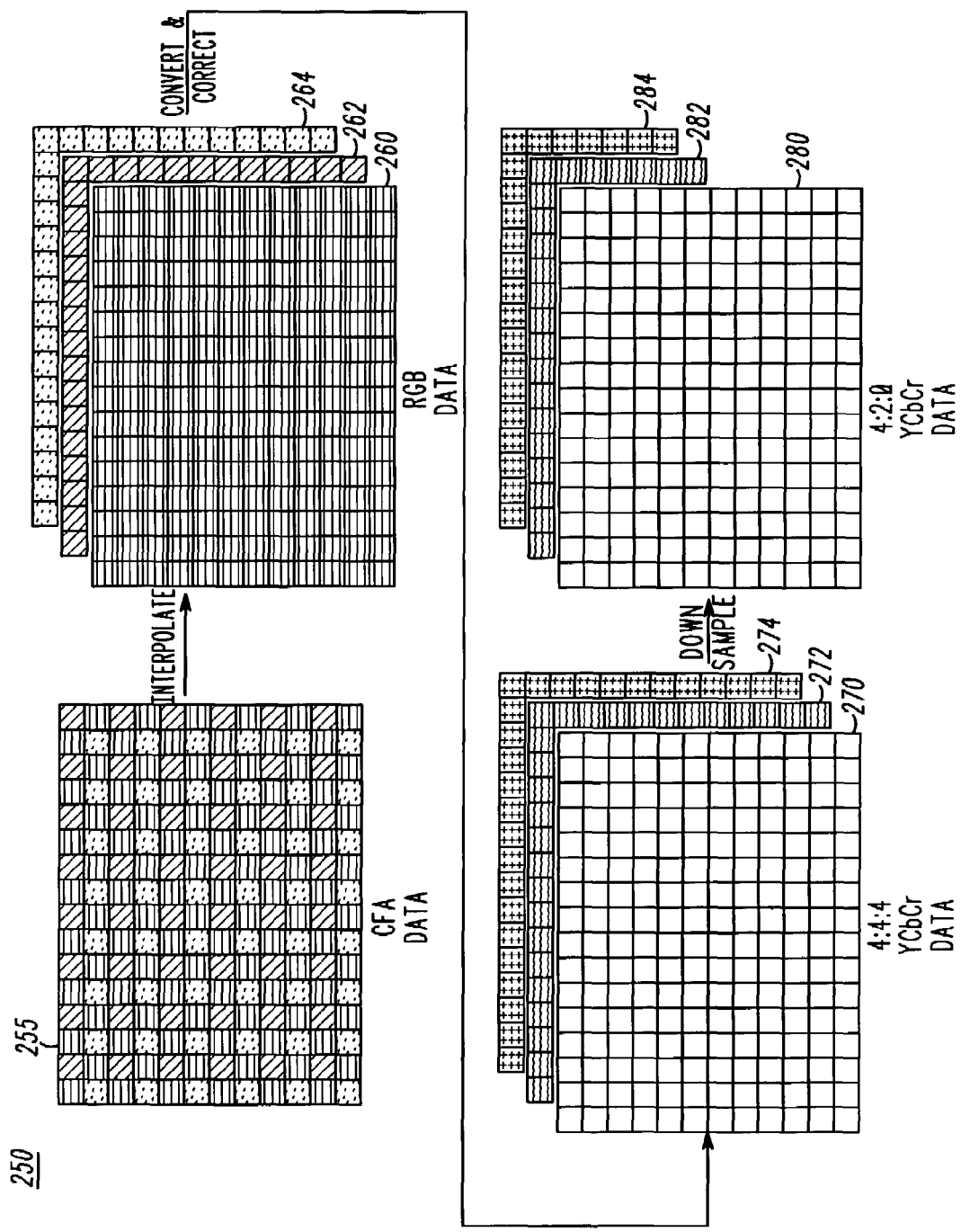
FIG. 2B —PRIOR ART—

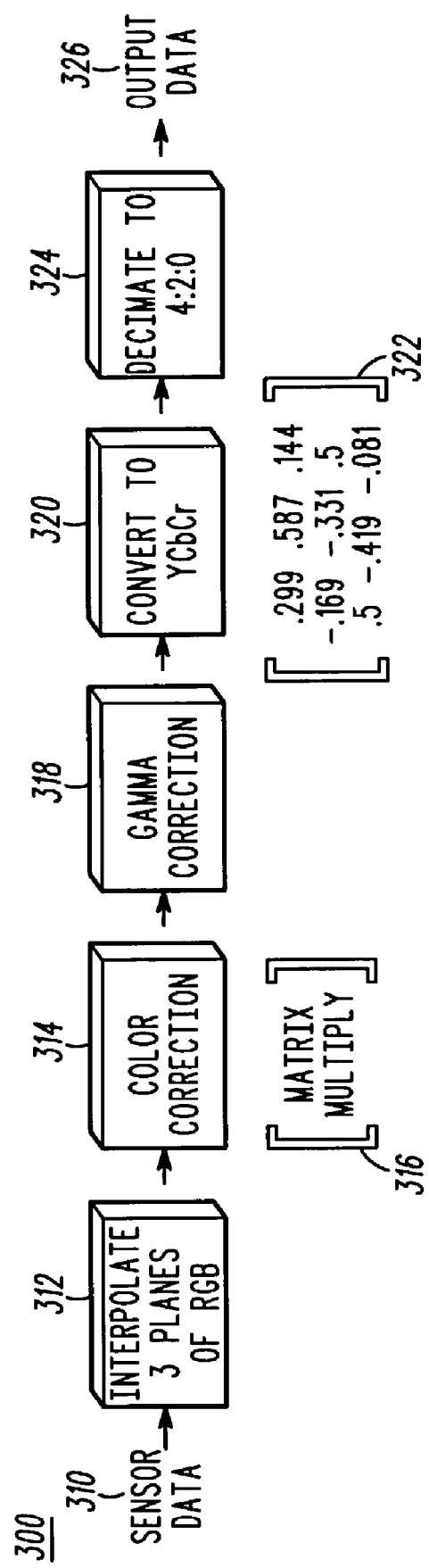
FIG. 3A —PRIOR ART—

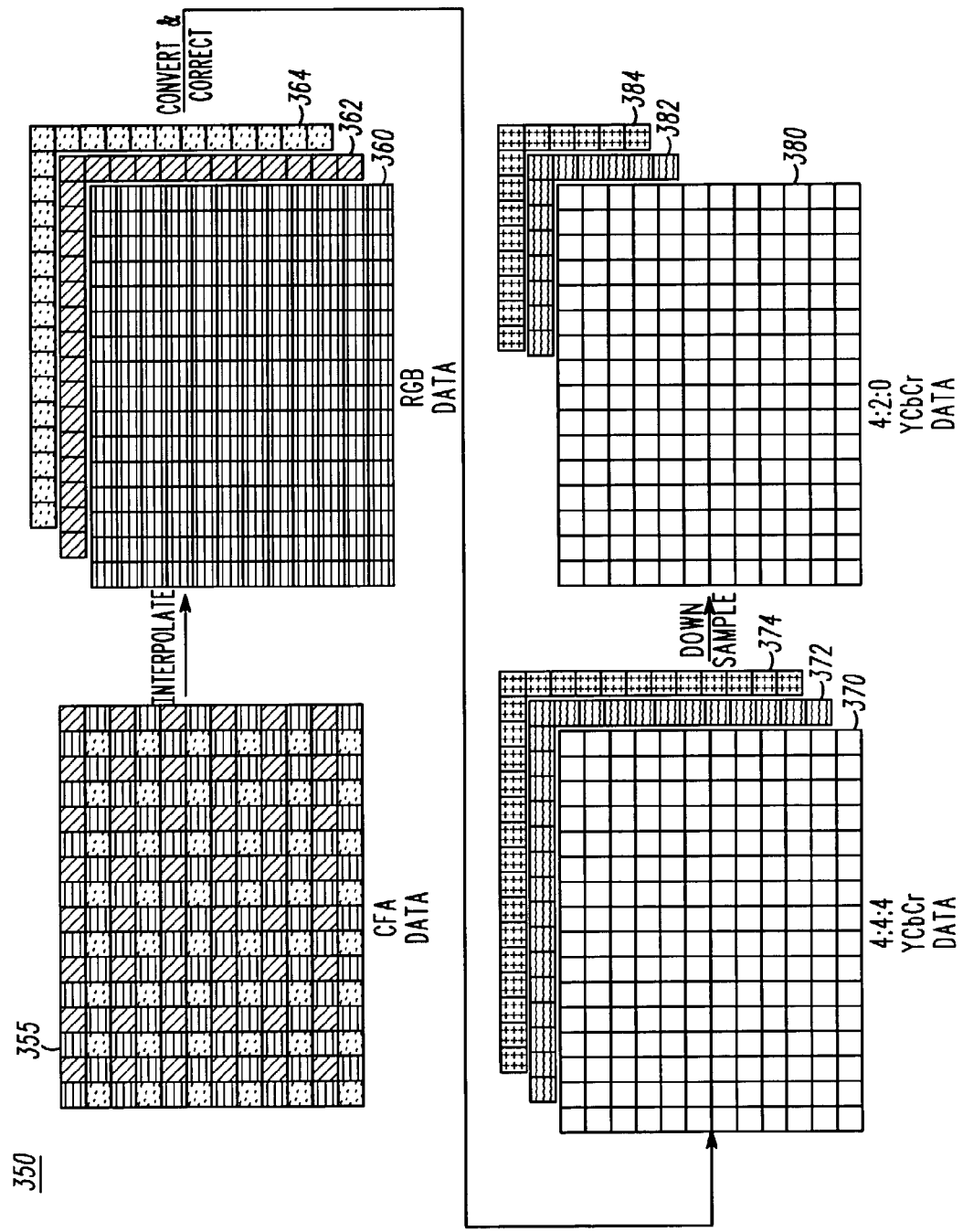
FIG. 3B —PRIOR ART—

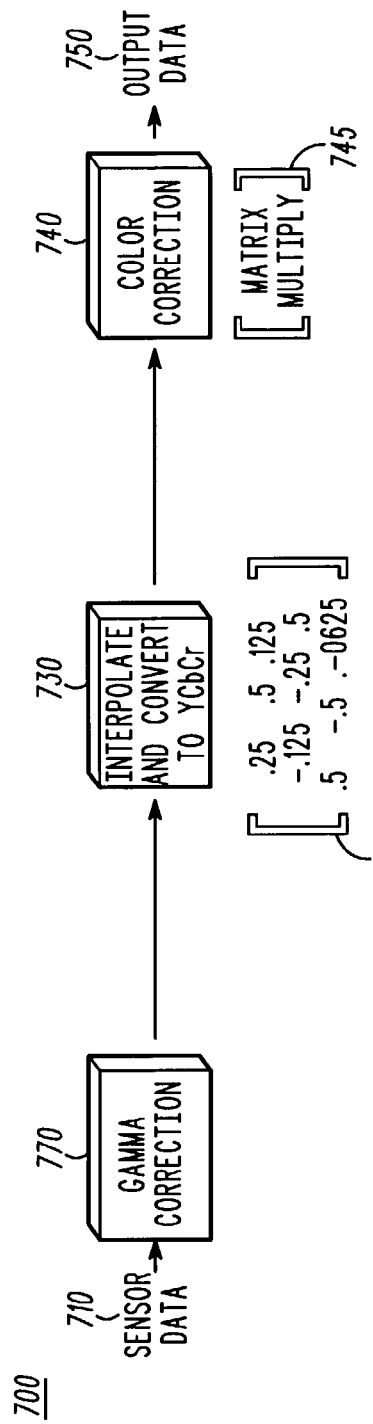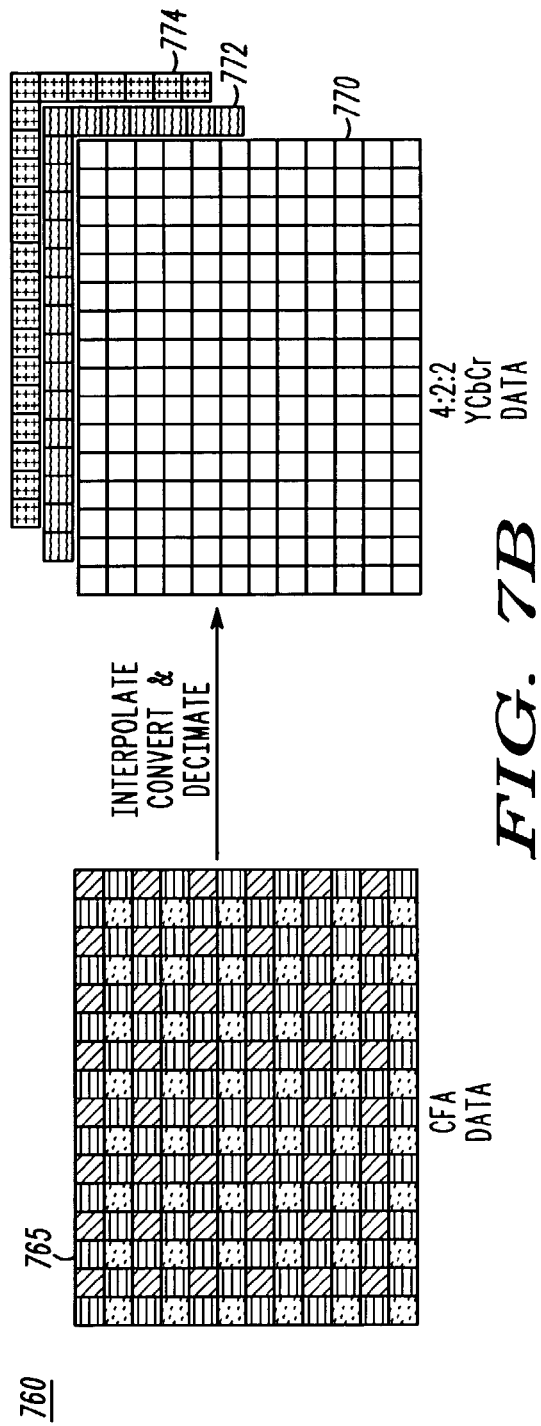

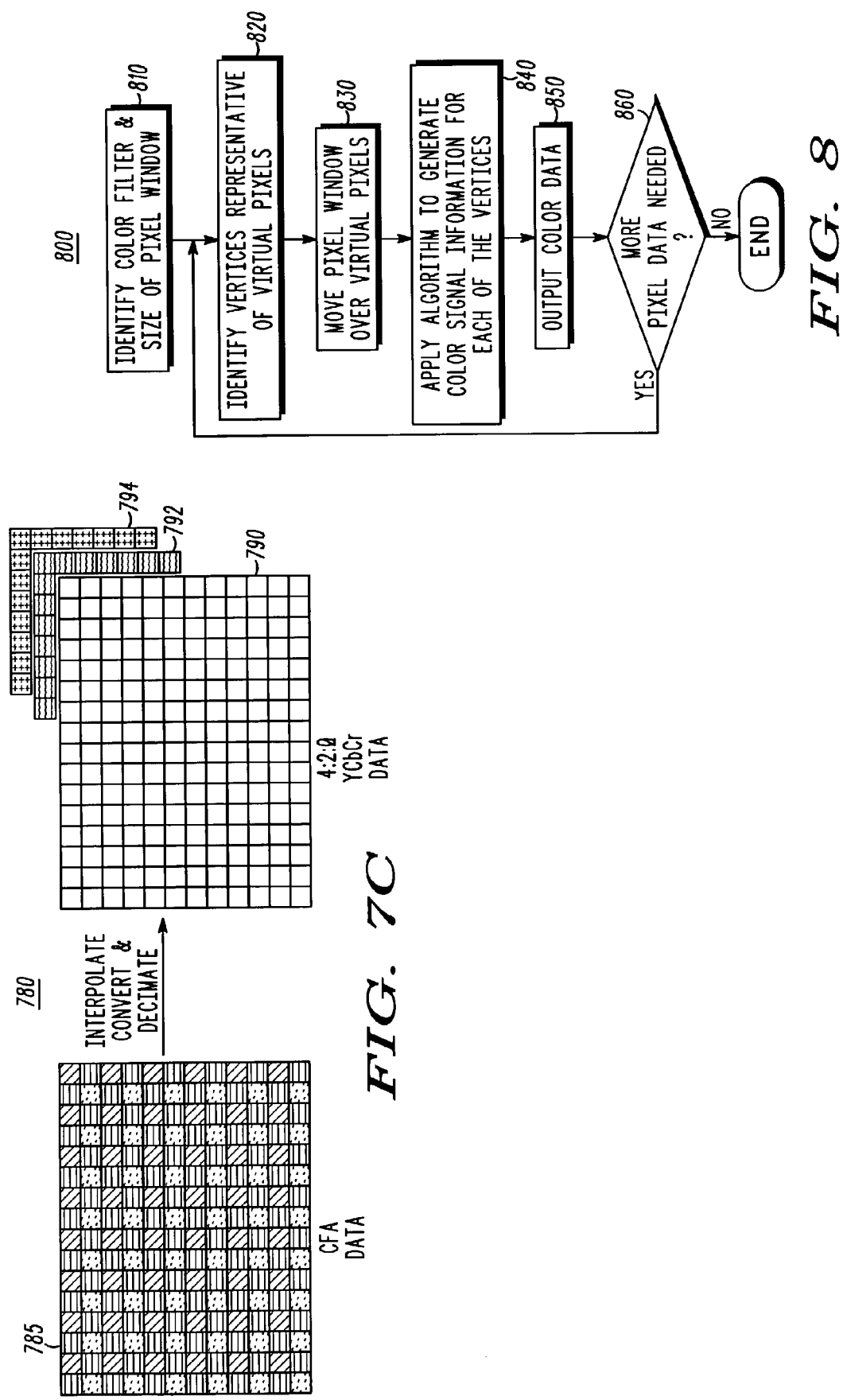

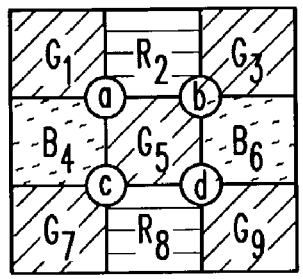
*FIG. 9*
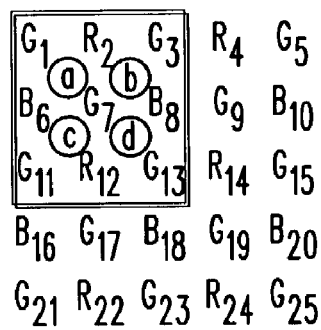   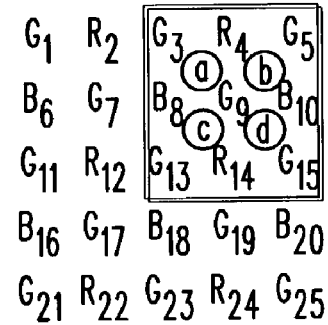
*FIG. 10A*   *FIG. 10B*
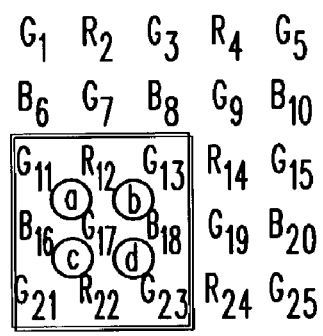   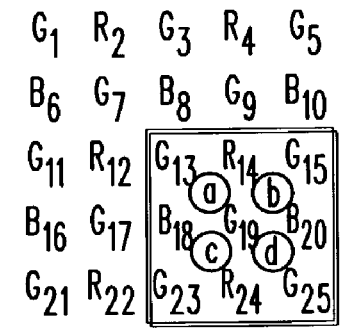
*FIG. 10C*   *FIG. 10D*

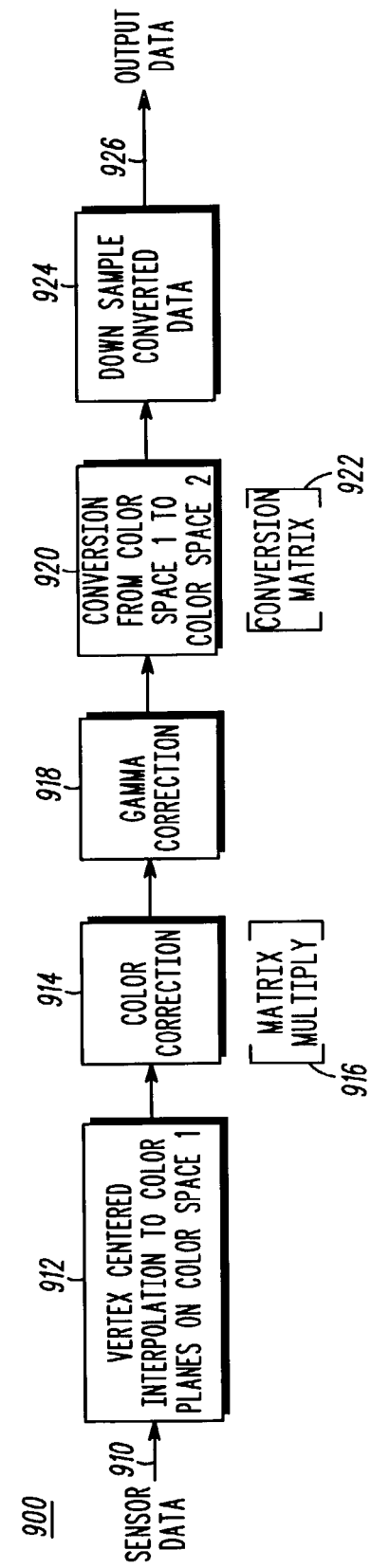
FIG. 11A  FIG. 11B  FIG. 11C  FIG. 11D
FIG. 12A

COLOR DATA IMAGE ACQUISTION AND PROCESSING

FIELD OF THE INVENTION

This invention relates generally to the field of color sensor imaging, including image acquisition and processing to include interpolation and conversion from raw color sensor image data to desired color space data.

BACKGROUND OF THE INVENTION

Color sensor data is a measurement of the intensity of light that is absorbed by a pixel of a sensor. Since different colors absorb lights are different rates, the intensity at which light is absorbed by the pixels of the sensor is an indication of the color of light that has been absorbed. Relative absorption levels can thus be represented as digital voltages in digital format to represent objects. Data from single color sensor devices capable of displaying color images, that employ one or more of video frame as well as still image capture must be interpolated from raw sensor image data that has been derived from color filter array (CFA), a physical material placed over sensors to make sure that only the correct color information is provided to the sensors, to a color space to generate a full resolution color image. Such image devices can include, but should not be limited to, digital cameras, video phones, and camcorders.

There are many color spaces that may be used, including the Red Green Blue color space, denoted by RGB, a color space defined by Magenta, Green and Yellow colors or MGY, YUV, YCbCr, wherein the Y luma component denotes the brightness of an image and the two color difference components Cb and Cr denote the chroma information of that image. Color space data may optionally be down-sampled, also referred to as sampling, subsampling or decimating. Common down-sampling indicators include 4:4:4, 4:2:2, 4:1:1, 4:2:0, etc. 4:4:4 RGB denotes a 2×2 array of RGB pixels that occupy a total of 12 bytes, assuming 8 bits per sample. YCbCr components can be formed from the RGB color space; without subsampling from 4:4:4 RGB, this is referred to as 4:4:4 YCbCr. 4:2:2 is a type of sampling used in YCbCr digital video in which chroma (CbCr) components are subsampled by a factor of 2 along the horizontal axis and in which chroma samples are cosited with alternate luma samples. In an 8-bit system using 4:2:2 YCbCr coding, for example, the 2×2 array would occupy 8 bytes and the aggregate data capacity would be 16 bits per pixel. This type of subsampling is often used for studio digital video. In 4:1:1 sampling, used in some digital video systems, chroma components are subsampled by a factor of four horizontally. The uncompressed data capacity is 12 bits per pixel. In 4:2:0 YCbCr sampling, often used in JPEG and MPEG systems, Cb and Cr are each subsampled by a factor of 2 along the horizontal and vertical axes. Chroma samples are interstitially sited, vertically between lines and are horizontally sited halfway between alternate luma samples (unlike the cositing of chroma samples in 4:2:2 sampling). The uncompressed aggregate data capacity of 4:2:0 sampling is 12 bits per pixel.

As can be seen from the traditional image acquisition and processing chain illustrated in FIGS. 2A-3B, there are many steps required to generate usable output data, in a desired color space, from raw sensor data. Many of the functions illustrated in the FIGS. 1A-2B are time-consuming and processor intensive. Referring now to the functional flow 100 of FIG. 1A, raw sensor data 110 is interpolated to one or more color planes in a first color space at 112. For instance, the raw sensor data may be CFA data that is interpolated to the three planes of color in the RGB color space. At 114, color correction of the interpolated color plane data is performed by assistance of a matrix multiply 116. Color correction serves to make the color more saturated so as to be perceived in a more pleasant manner. Color correction at 114, is performed in color space 1. Next, at 118 gamma correction is performed to compensate for the gamma function of the display device upon which the image is to be displayed, such as a monitor's liquid crystal display (LCD). Conversion from the first color space to a second color space takes place, aided by a conversion matrix. The conversion matrix 122 is usually a standard conversion matrix or multiplier that is used to perform the conversion, such as a standard conversion matrix capable of converting RGB color space data to YCbCr color space data. Often the conversion matrix will use conversion values that require the use hardware capable of performing multiplier functionality, in addition to just add and shift functionality, as will be demonstrated in FIGS. 2A and 3A below. At 124, the color space 2 data may optionally be down-sampled to the desired format. The output color space two data 126 is thus generated after the conversion at 120 or the optional subsampling at 124.

FIG. 1B illustrates a color space flow 150 that tracks the effects of functional flow 100 on the color spaces. CFA raw sensor data 150 is interpolated into the first color space, which, in this illustration, comprises three color planes 160, 162, 164. These planes of color space 1 are next converted to planes 170, 172, 174 of the second color space following the color correction and gamma correction detailed at 114 and 118 above in the first color space. Finally, the color space 2 data can be optionally down-sampled, i.e. sampled or decimated, to obtain corresponding planes 180, 182, 184 of down-sampled, converted data in color space 2.

FIGS. 2A-3B illustrate the traditional image acquisition and procession chain for two specific color space examples. Again, interpolation, color correction and gamma correction of the color data is performed in color space 1, while any optional down-sampling is performed in color space 2 after conversion from color space 1 to color space 2 has taken place. In these figures, RGB CFA raw sensor data is provided to the processing chain, but the down-sampling of converted YCbCr data is processed differently.

Referring now to FIGS. 2A-2B, an exemplary example of interpolation, correction and conversion of color data from the RGB color space to the YCbCr color space, followed by decimation to 4:2:2 YCbCr, is demonstrated. As noted above, 4:2:2 sampling, in which chroma components are subsampled by a factor of 2 along the horizontal axis coincident with alternate luma samples, is often used for digital video applications. Functional flow 200 starts when raw sensor data 210 is provided for interpolation to three planes, one each of Red, Green, Blue, in the RGB color space 1 at 212. Color correction 214 of the RGB plane data is performed using matrix multiply 216, followed by gamma correction 218. Next, the RGB color data is converted 220 using the conversion matrix illustrated as 222. The use of the parameter values shown in conversion matrix 222 requires the use of additional conversion hardware, in the form of multipliers, not just adders and shifters.

The color space flow 250 of FIG. 2B reflects changes to the color space caused by the functional flow 200 of FIG. 2A. Raw CFA RGB data 255 is interpolated into the RGB data color planes, one each for Red, Green, and Blue, and shown as 260, 262, 264. Following color correction and gamma correction in the first RGB color space, the data is converted to 4:4:4 YCbCr color data planes 270, 272, 274. This converted color data may optionally be subsampled to 4:2:2 YCbCr color data planes 280, 282, 284, as shown.

Referring now to FIGS. 3A-3B, an exemplary example of interpolation, correction and conversion of color data from the RGB color space to the YCbCr color space, followed by decimation to 4:2:0 YCbCr, will now be discussed. 4:2:0 is often used in JPEG and MPEG applications and the Cb and Cr components are each subsampled by a factor of 2 for both the horizontal and vertical axes chroma or Y samples are sited interstitially in a vertical fashion halfway between the lines and are sited horizontally halfway between alternate luma samples. Functional flow 300 starts when raw CFA sensor data 310 is provided for interpolation to three planes, one each of Red, Green, Blue, in the RGB color space 1 at 312. Color correction 314 of the RGB plane data is performed using matrix multiply 316, followed by gamma correction 318. Next, the RGB color data is converted 320 using the conversion matrix illustrated as 322. The use of the parameter values shown in conversion matrix 322 requires the use of additional conversion hardware, in the form of multipliers, not just adders and shifters.

The color space flow 350 of FIG. 3B reflects changes to the color space caused by the functional flow 300 of FIG. 3A. Raw CFA RGB data 355 is interpolated into the RGB data color planes, one each for Red, Green, and Blue, and shown as RGB color planes 360, 362, 364. Following color correction and gamma correction in the first RGB color space, the data is converted to 4:4:4 YCbCr color data planes 370, 372, 374. This converted color data may optionally be subsampled to 4:2:0 YCbCr color data planes 380, 382, 384, as shown.

As can be seen in FIGS. 1A-3B, a primary concern is the interpolation of color sensor data to the RGB color space. For those cases where YCbCr data is required, the interpolated RGB data is converted to YCbCr data via a matrix multiply and then decimated to generate the desired data, such as the 4:2:2 or 4:2:0 sampling demonstrated in FIGS. 2 and 3. This process is inefficient because the three full planes of color data in the RGB color space must be interpolated and converted, and ultimately some of the calculated data is discarded.

The manner in which interpolation may be performed in the traditional image acquisition and processing approach of FIGS. 1A-3B will now be explored. Interpolation of color data from a single sensor traditionally operates by moving a sliding window over the sensor data and computing a single pixel value for that window. This approach has centered the window used in the interpolation process over a single pixel and then generated a single pixel output value. Most color filter arrays have a 2×2 color filter pattern, such as a Bayer pattern for RGB color data, for example, and consequently four different interpolation algorithms are required depending on which of the four pixels the window centered. Other color data patterns may of course be used, such as a striped pattern. Other color filter patterns, such as Cyan, Yellow, Magenta, could also be used in place of the RGB color filter pattern shown in this example. A 3×3 window is used to compute a single interpolated value for the center pixel of that window. Interpolation by this pixel-by-pixel approach is thus not only very time-consuming; it also represents a major commitment in processing resources.

FIG. 4 illustrates a simplified traditional pixel-centered interpolation using a 3×3 pixel window centered over a 2×2 Bayer color filter pattern, shown as a Green pixel in the upper left position, a Red pixel in the upper right position, a Blue pixel in the lower left position, and a Green pixel in the lower right position. A corresponding YCbCr pattern could be used if working in the YCbCr color space. RGB data from the pixels surrounding the centered pixel are used to interpolate RGB output data for the center pixel. In the figure, the 3×3 pixel window is centered over the center pixel in the window, G5. The single output pixel value for pixel G5, referred to as P5, is given by:

$$P5 = f(G1, R2, G3, B4, G5, B6, G7, R8, G9)$$

This indicates that the Red, Green and Blue components of pixels G5, given as R5, G5, and B5, respectively, might be given as:

$$R5 = (R2+R8)/2$$

$$G5 = (G1+G3+G7+G9+G5)/5$$

$$B5 = (B4+B6)/2$$

It is noted that in addition to the interpolation described above, other interpolation methods may be used, including, but not limited to, nearest neighbor replication, bilinear interpolation, smooth hue transition interpolation, binary interpolation, for example.

This approach will only provide output color data for the pixel centered in the window, G5, so the pixel window has to be moved to a new pixel in order to generate interpolated output color data for that pixel. This is illustrated in FIGS. 5A-5D, in which the pixel window is centered over four different pixels of interest G7, B8, R12, and G13 to interpolate output color data for them. The 2×2 Bayer color filter pattern has been maintained for simplicity and is repeated over 25 pixels as shown. The four interpolated pixels for which color data output values are generated, G7, B8, R12, and G13, require positioning the window four times, with the pixel window being centered over four different patterns. In FIG. 5A, the pixel pattern, starting in the upper left corner of the 3×3 window and reading across rows from left to right, is G R G B G B G R G. In FIG. 5B, the pattern is R G R G B G R G R. In FIG. 5C, the pattern is B G B G R G B G B and in FIG. 5D, the pattern is G B G R G R G B G. Consequently, four different interpolation algorithms are required, depending upon which of the four pixels the pixel window is centered.

The requirement of four different algorithms for interpolation is time-consuming and can represent a major drain on the computation powers required to carry them out. There is also a corresponding increase in the amount of hardware that is required to carry out the instructions of these algorithms. Moreover, the many functions provided in the traditional image acquisition and processing chain, of which interpolation is but one, are each performed in serial fashion. These many steps are time consuming and use up processor resources. It would be advantageous in the art to have a less complex method for image acquisition and processing.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1A is a functional flow of an image acquisition and processing chain consistent with the prior art; FIG. 1B is a color space flow consistent with the functional flow of FIG. 1A.

FIG. 2A is a functional flow of an image acquisition and processing chain illustrating conversion from RGB to 4:2:2 YCbCr data consistent with the prior art;

FIG. 2B is a color space flow consistent with the functional flow of FIG. 2A.

FIG. 3A is a functional flow of an image acquisition and processing chain illustrating conversion from RGB to 4:2:0 YCbCr data consistent with the prior art;

FIG. 3B is a color space flow consistent with the functional flow of FIG. 3A.

FIG. 7A is a functional flow of an image acquisition and processing chain using a simplified conversion matrix to convert color sensor data to YCbCr format consistent with certain embodiments of the invention; FIGS. 7B and 7C are color space flows consistent with the functional flow of FIG. 7A.

FIG. 8 is a process flow illustrating vertex-based interpolation consistent with certain embodiments of the invention.

FIG. 9 illustrates an exemplary pixel window and virtual pixels for vertex-based interpolation consistent with certain embodiments of the invention.

FIGS. 10A-10D illustrate vertex-based interpolation, consistent with certain embodiments of the invention.

FIGS. 11A-11D illustrate exemplary vertex-based interpolation examples, consistent with certain embodiments of the invention.

FIG. 12A is a functional flow of an image acquisition and processing chain using vertex-based interpolation, consistent with certain embodiments of the invention.

DETAILED DESCRIPTION OF THE INVENTION

Figures 4, 5A, 5B, 5C, 5D:
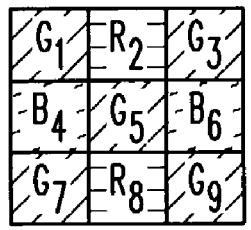
FIG. 4 is a 3×3 pixel window useful for describing pixel-centered interpolation, consistent with the prior art.
FIGS. 5A-5D illustrate pixel-centered interpolation, consistent with the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

Figure 6A:
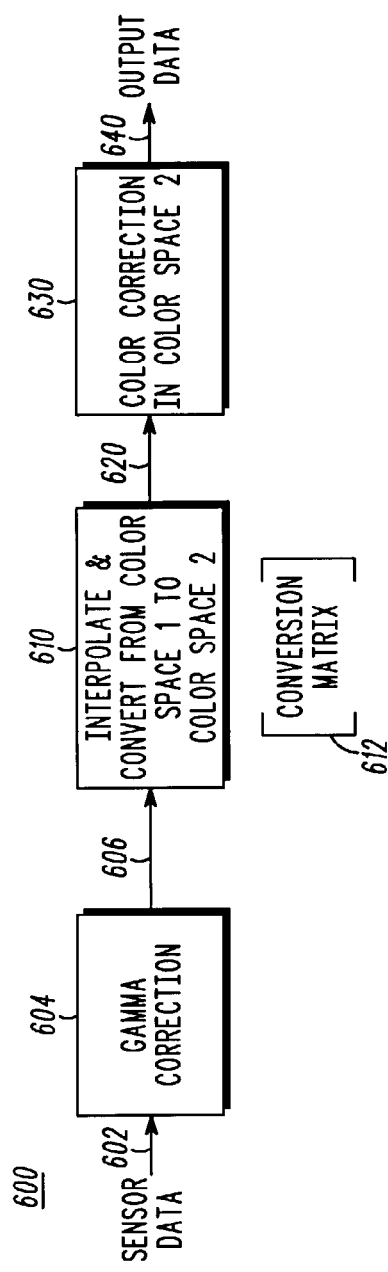
FIG. 6A is a functional flow of an image acquisition and processing chain consistent with certain embodiments of the invention.
Figure 6B:
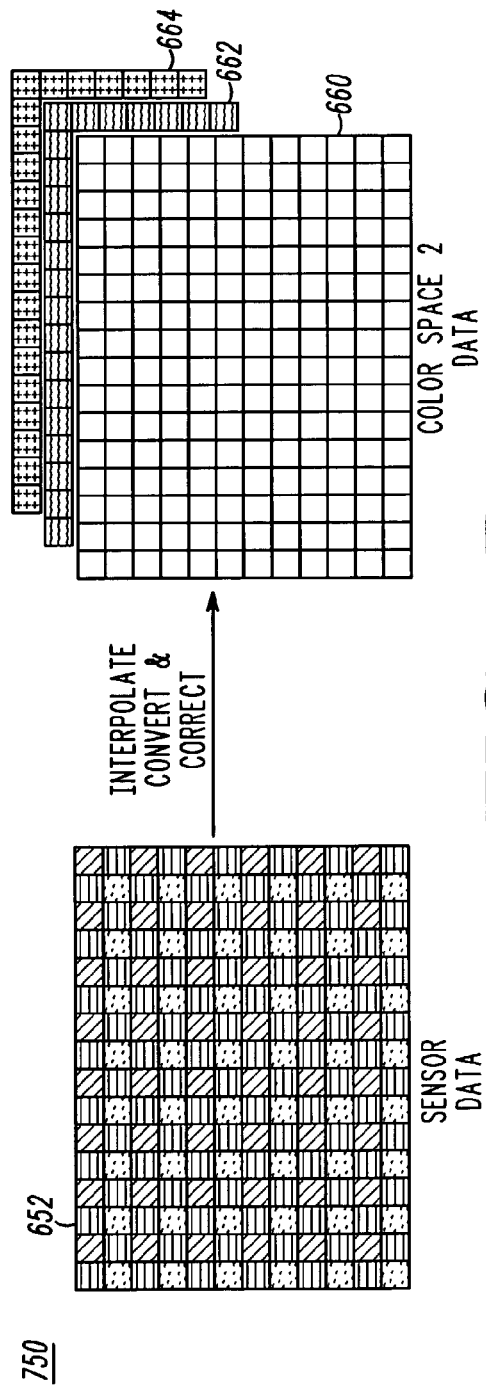
FIG. 6B is a color space flow consistent with the functional flow of FIG. 6A.

Referring now to FIGS. 6A and 6B, a simplified image acquisition and processing approach of the invention is demonstrated. In FIG. 6A, it can be seen that the functional flow 600 for image acquisition and processing has been greatly simplified in accordance with an embodiment of the present invention. In this embodiment of the present invention, interpolation and conversion are combined to provide a simplified color space interpolation and conversion that is much more streamlined than that of the prior art. Sensor data 602 in color space 1 is provided for gamma correction at 604. The gamma corrected sensor data 606 produced by gamma correction block 604 is provided to interpolation and conversion block 610 which directly interpolates and converts, in accordance with the conversion matrix parameters and in a manner exhibiting combined functionality preferably without intervening process steps, this data from the provided sensor color data in color space 1 to a target color space, such as color space 2, without separately processing the data at initial color space 1. Interpolation and conversion of the color data from the first to second color space yields color space 2 data values 620 which are provided for color correction, also in color space 2, at block 630. The color data output values 640 are thus values that have been interpolated and converted from color space 1 raw data 602, that has been gamma corrected in color space 1 at block 604 but color corrected in color space 2 at block 630. Again, an aspect of the present invention envisions the use of a corrective matrix, described further below, to compensate for round-off errors introduced into the data in the event that the algorithm uses a simplified conversion matrix at 612.

As will be described, the parameters of conversion matrix 612 may be of a standard type, such as that shown in conversion matrix 222 and 322 of FIGS. 2A and 3A, respectively, or that of a simplified color conversion matrix that does not require the use of multipliers in the conversion hardware for this purpose. Such as a simplified color conversion matrix, however, calls for the use of a compensating matrix during the subsequent color correction of Block 630 as will be shown below. Moreover, the combined interpolation/conversion functionality may apply interpolation approaches known in the art or may utilize a vertex-centered interpolation approach, described below in FIGS. 8-11, in accordance with another embodiment of the invention. Further, it will be described further in connection with FIGS. 12A and 12B, that the vertex-centered interpolation of the invention may be practiced in a functional flow that does not utilize a combined interpolation/conversion effect and still provide an improvement over the known art.

Pseudomedian filtering of the color data in the second color space may optionally be performed following the direction interpolation and conversion at 610 if so desired. Pseudomedian filtering provides for an expedited form of median filtering to be performed with negligible loss of image quality and reduced hardware requirements.

FIG. 6B illustrates a color space flow 650 that reflects changes in the color spaces of the data as a result of the functionality embodied in FIG. 6A. Raw sensor data 652, representative of sensor data 602 in FIG. 6A is interpolated, converted and corrected to produce planes of data 660, 662, 664 in color space 2.

It should be quite clear from FIGS. 6A and 6B that the present invention, regardless of the type of combination interpolation and/or conversion that is practiced, provides a solution that is much more streamlined and requires less hardware and processing resources than the prior art. The interpolation technique of the present invention, as well as the image acquisition and processing method, may be implemented as an algorithm in either hardware or software. To implement in hardware, the algorithm may be instructions implemented in one or more application specific integrated circuits (ASICs) or digital signal processors (DSPs).

While previous approaches have used the color space 1 to color space 2 conversion matrix, such as a RGB to YCbCr conversion matrix, as part of the interpolation process, an aspect of the present invention reorders the processing chain to use a simplified conversion matrix to approximate the color space 2 data in a manner that requires only shifts and adds—no multiply operations. The slight errors incurred by converting to an approximation of the color space 2 data are compensated for in the color correction matrix of the color correction portion of the process, which is performed anyway. The color correction is thus performed in color space 2 rather than in color space 1, unlike the ordering followed in FIG. 1A.

FIGS. 7A-7C illustrate examples of the direct interpolation/conversion approach to the image acquisition and processing method in which the use of a simplified conversion matrix, and thus the introduction of errors, calls for the use of a compensation matrix during the subsequent color correction. The use of a simplified conversion matrix simplifies and reduces the hardware needed to perform the conversion algorithm as multipliers are not used during conversion. These examples illustrate the conversion from raw sensor data to YCbCr color data but the sensor data coming in could also be interpolated and converted to other color spaces as well, including the RGB color space. Referring now to FIG. 7A, functional flow 700 starts with sensor data 710 upon which gamma correction is performed at block 720. The gamma corrected raw color data is provided to block 730, which interpolates and converts it, in accordance with conversion matrix 735, to generate color data in the desired color space. The interpolated and converted data is provided to block 740 for color correction in accordance with compensation matrix 745. The output data 750 is thus color and gamma corrected interpolated and converted data in the end color space desired.

In this example, it can be seen that the contents (parameters) of the conversion matrix multiply 735 are values that can be obtained using simple adder and shifter logic; in this case, they are all divisible by even fraction values, such as ¹⁄₁₆ or greater. It is noted that the size of the conversion matrix 735 reflects a 3×3 pixel window size, but the size may be changed without departing from the spirit and scope of the invention. The use of evenly divisible parameters, as shown, greatly simplifies the conversion process, requiring no multiplier logic at all in the conversion hardware or otherwise, but this convenience does introduce round-off errors in the converted data generated by 730 and 735. This error is corrected by the compensation multiply matrix 745 performed during the subsequent color correction at block 740. The color output data values 750 generated at 740 and 745 is thus data that has been normalized with respect to any error introduced during the conversion at 735.

The flow 700 of FIG. 7A illustrates interpolation and conversion at 730, 745 into YCbCr data. The YCbCr data may optionally be decimated (downsampled). FIGS. 7B, 7C illustrate color space flows in which two possible YCbCr decimation targets are reaches: 4:2:2 and 4:2:0. In FIG. 7B, color space flow 760 raw CFA sensor data 765 is interpolated/converted and then decimated into the three color planes 770, 772, 774 representative of 4:2:2 YCbCr format. Similarly, in the color space flow 780 of FIG. 7C, raw, unprocessed sensor color data 785, after being interpolated, converted, and optionally decimated at 730, 735 yields three planes 790, 792, and 794 of 4:2:0 YCbCr color data.

As was previously noted, the type of interpolation used in the present invention may be pixel-centered approach of FIGS. 4-5. Another embodiment of the present invention, however, uses vertex-based interpolation to further the results obtained from interpolation, whether used in the combined direct interpolation/conversion approach illustrated in FIG. 6 or a standard image acquisition and processing approach, as in FIGS. 12A and 12B in which interpolation takes place separately from the conversion portion of the method.

In accordance with an interpolation aspect of the above-referenced invention, the use of vertex-centering, as opposed to pixel-centering, of the pixel window allows for the same pixel pattern to be maintained as the window is moved and thus accommodates the use of a single algorithm for that pattern to be used in common for multiple interpolations of pixels of interest. Moreover, the use of vertex-centering of the pixel window over the sensor pixels is much more efficient than the pixel-centering approach insomuch as multiple pixel color data is generated in parallel by the algorithm for each of the virtual pixels located at the vertices of the centered sensor pixel each time the window is centered. The use of vertex-centering uses at least a 3×3 pixel window in order to have virtual pixels of a target pixel of interest.

The flow 800 of FIG. 8 describes vertex-based interpolation in accordance with an aspect of the present invention. At Block 810, the color filter type and thus size of pixel window to be used is identified. As will be shown in the following examples, the color filter pattern will often be a 2×2 pattern, such as a 2×2 RGB Bayer pattern, and a 3×3 pixel window is used to center over the vertices adjacent to the pixel of interest, referred to as the virtual pixels. While this is the most direct approach and is representative of a preferred embodiment, the invention should not be construed as requiring the use of a certain size of color pattern or pixel window. The pixel window will need to be a minimum 3×3 size in order to be placed over the virtual pixels adjacent a pixel of interest. It is noted, however, that a larger pixel window may be used as well. Even if the pixel window is not "centered" over the virtual pixels associated with the pixel of interest, as long as they are identifiable within the pixel window, the algorithm can be adjusted to still calculate their color values in a parallel fashion. Nor is it a requirement that the virtual pixels be adjacent to the pixel of interest, although this is a preferred embodiment of the invention. Again, if a pixel window larger than 3×3, such as a 4×4, a 5×5, a 3×4, a 4×5, etc., is used, is can be seen that it is not necessary that the virtual pixels be adjacent the actual pixel of interest, nor that the pixels or the pixel of interest itself will be centered within the pixel window.

Referring back to FIG. 8, the vertices of the pixel of interest chosen to define the virtual pixels are identified at Block 820. Again, the vertices are preferably adjacent the pixel of interest, but this is not a requirement of the invention. Next, at Block 830, the pixel window is positioned over the vertices that represent the virtual pixels; the positioning of the pixel window may be centered but is not required. At Block 840, the algorithm that has been developed to simultaneously or in parallel generate the interpolated color data output values for the virtual pixels is run. Again, the algorithm may be implemented in software or hardware. The generated output color data for the vertices is made available at Block 850. Decision Block 860 determines whether more interpolated output color data needs to be generated. If so, then the flow returns to block 820 to identify the virtual pixels (vertices) that can be used to represent the new pixel of interest.

Referring now to FIG. 9, a simplified example of vertex-centered interpolation using a 3×3 pixel window of RGB pixels arranged in a 2×2 Bayer color filter pattern is shown. The pixel window is centered over the four vertices 5a, 5b, 5c, and 5d surrounding pixel G5 and the pixel output values for these virtual pixels, P5a, P5b, P5c, and P5d, may be determined by an algorithm in accordance with the values of the pixels adjacent to them and may be generated in parallel by the algorithm.

$$P5a=f(R2, G1, G5, B4)$$

$$P5b=f(R2, G3, G5, B6)$$

$$P5c=f(R8, G5, G7, B4)$$

$$P5d=f(R8, G5, G9, B6)$$

The individual R, G, and B color components of the virtual pixels 5a, 5b, 5c, and 5d may thus be given by:

$$R5a=R2$$

$$R5b=R2$$

$$R5c=R8$$

$$R5d=R8$$

$$G5a=(G1+G5)/2$$

$$G5b=(G3+G5)/2$$

$$G5c=(G5+G7)/2$$

$$G5d=((G5+G9)/2$$

$$B5a=B4$$

$$B5b=B6$$

$$B5c=B4$$

$$B5d=B6$$

P5 could be RGB colors, as indicated above, or it could be color values in another color space, such as YCbCr, for example.

As mentioned previously, this vertex-centered interpolation may be performed in combination with the conversion step to provide a simplified image acquisition and processing chain, as illustrated in FIGS. 6A and 6B. Furthermore, the conversion matrix 612 used during conversion may be one capable of being implemented with only adders, shifters, and no multipliers, as illustrated by the simplified conversion matrix 735 of FIG. 7A, or it may be one that allows for direct conversion from color space 1 to color space 2 but which requires multiplier logic to work. Again, the use of the simplified conversion matrix does call for the use of a subsequent color correction matrix, akin to compensation matrix 745, also of FIG. 7A.

Continuing with the 3×3 pixel window overlaying a 2×2 Bayer color filter pattern to define four virtual pixels G5a, G5b, G5c, and G5d, the color output data values for interpolation combined with direct conversion will now be given. For vertex-centered interpolation combined with direct conversion implemented with a non-simplified conversion matrix, such as matrix 322 of FIG. 3A, for example, the color output data values in color space 2 620, in this case decimated 4:2:0 YCbCr values, are given as follows:

$$Y5a=0.299*R2+0.587*(G1+G5)/2+0.114*B4$$

$$Y5b=0.299*R2+0.587*(G3+G5)/2+0.114*B6$$

$$Y5c=0.299*R8+0.587*(G5+G7)/2+0.114*B4$$

$$Y5d=0.299*R8+0.587*(G5+G9)/2+0.114*B6$$

$$Cb=-0.169*(R2+R8)/2-0.1655*G5-0.1655*(G1+G3+G7+G9)/4+0.5*(B4+B6)2$$

$$Cr=0.5*(R2+R8)/2-0.21*G5-0.21*(G1+G3+G7+G9)/4-0.081*(B4+B6)/2$$

For decimation to 4:2:2 YCbCr, the Cb and Cr values would be as follows:

$$Cb1=-0.169*R2-0.331*(G1+G3+G5)/3+0.5*(B4+B6)/2$$

$$Cb2=-0.169*R8-0.331*(G5+G7+G9)/3+0.5*(B4+B6)/2$$

$$Cr1=0.5R2-0.419*(G1+G3+G5)/3-0.081*(B4+B6)/2$$

$$Cr2=0.5R8-0.419*(G5+G7+G9)/3-0.081*(B4+B6)/2$$

It can be seen from this example how the use of the parameters of the non-simplified conversion matrix require the use of multiplication logic to be implemented.

For vertex-centered interpolation combined with direct conversion implemented with a simplified conversion matrix, such as matrix 735 of FIG. 7A, for example, the 4:2:0 YCbCr color output data values 620 in color space 2 are given as follows:

$$Y5a=R2/4+(G1+G5)/4+B4/8$$

$$Y5b=R2/4+(G3+G5)/4+B6/8$$

$$Y5c=R8/4+(G5+G7)/4+B4/8$$

$$Y5d=R8/4+(G5+G9)/4+B6/8$$

$$Cb=-(R2+R8)/8-G5/8-(G1+G3+G7+G9)/32+(B4+B6)/4$$

$$Cr=(R2+R8)/4-G5/4-(G1+G3+G7+G9)/16-(B4+B6)/32$$

And for decimation to 4:2:2 YCbCr, the Cb and Cr values would be as follows:

$$Cb1=-(R2)/8-[(G1+G3)/2+G5]/2/4+(B4+B6)/4$$

$$Cb2=-(R8)/8-[(G7+G9)/2+G5]/2/4+(B4+B6)/4$$

$$Cr1=R2/2-[(G1+G3)/2+G5]/2/2-(B4+B6)/32$$

$$Cr2=R8/2-[(G7+G9)/2+G5]/2/2-(B4+B6)/32$$

As previously mentioned, pseudomedian filtering may optionally be performed if desired, following the combined interpolation and conversion block 610 and before the color correction in color space two at block 630 shown in FIG. 6A. Continuing with the above examples of direct interpolation and conversion to the YCbCr color space, pseudofiltering may next be performed on the Cb and Cr components of the G5 pixel as follows:

| Cb1 | Cb2 | Cb3 |
| Cb4 | Cb5 | Cb6 |
| Cb7 | Cb8 | Cb9 |

New Cb5 value=Median (Median (Cb1, Cb2, Cb3), Median (Cb4, Cb5, Cb6), Median (Cb7, Cb8, Cb9))

| | | |
|---|---|---|
| Cr1 | Cr2 | Cr3 |
| Cr4 | Cr5 | Cr6 |
| Cr7 | Cr8 | Cr9 |

Similarly, the pseudomedian filtering may be applied to the Cr component as follows:

New Cr5 value Median (Median (Cr1, Cr2, Cr3), Median (Cr4, Cr5, Cr6), Median (Cr7, Cr8, Cr9))

Referring now to FIGS. 10A-10D, an example of moving the pixel window during vertex-centered interpolation to generate virtual pixel information multiple times is illustrated, again using a Bayer RGB color pattern. In this example, the common pixel pattern is, starting in the upper left corner of the 3×3 window and reading across rows from left to right, G R G B G B G R G. In FIG. 10A, the pixel window is centered over Green pixel G7 and overlays the vertices of G7 representative of four virtual pixels, shown as G7a, G7b, G7c, G7d. The color data output value of G7 is interpolated by the algorithm from the color data output values P7a, P7b, P7c, P7d that is interpolated, in parallel, for each of the four virtual pixels of G7 by the algorithm, as illustrated above in conjunction with FIG. 9. In FIG. 10B, the pixel for which color data is to be interpolated is pixel G9 and the pixel window is accordingly moved to cover pixel G9 and its four adjacent, virtual pixels G9a, G9b, G9c, and G9d. Again, the pixel data output values P9a, P9b, P9c, and P9d for each of these virtual pixels is generated by the algorithm at the same time, in parallel fashion. And use of the algorithm becomes very efficient as the same algorithm can be used to generate the output pixel values for the virtual pixels in FIG. 10A because the pattern has not changed. The pixel window may again be moved to overlay the virtual pixels G17a, G17b, G17c, and G17d adjacent to pixel G17 as shown in FIG. 10C. Output color values P17a, P17b, P17c, and P17d for these four virtual pixels are generated in parallel by the same algorithm used in FIGS. 10A and 10B because the color filter pattern over which the pixel window is arranged has not changed. Finally, the pixel window is moved in FIG. 10D to be centered about the virtual pixels G19a, G19b, G19c, and G19d adjacent to pixel G19 as shown. The output color values for these virtual pixels, P19a, P19b, P19c, and P19d, are generated by the same algorithm at the same time in parallel fashion in accordance with the generation of output color values discussed above in connection with FIG. 9. In the example given by FIGS. 10A-10D, this approach is at least four times as efficient as the pixel-centered windowing approach illustrated in FIGS. 5A-5D. In this particular Bayer RGB pattern, the pixel window can be moved two columns or two rows at a time while maintaining the same pattern within the window.

This interpolation aspect of the present invention, allows the pixel window to be centered over the same pattern to interpolate the color output data value of the centered pixel in a parallel fashion from the virtual pixels located at the vertices of the sensor pixel on which the window is centered. Centering the pixel window over the same pattern allows the same interpolation algorithm to be used each time the window is moved. Thus, in this example, color data output values are generated for four different pixels using a single interpolation algorithm on a constant and unchanging pixel pattern. It is four times as efficient at the pixel-centered example given in FIGS. 5A-5D. Each time the algorithm is run, 4 color data values are generated for each centering of the pixel window, based upon the 2×2 color filter pattern and the 3×3 pixel window of this example.

The vertex-centered approach of the present invention interpolates output pixel values from virtual pixels located at the vertices of the sensor pixels to provide a higher speed, lower complexity interpolation process than a pixel-centered interpolation approach. Placement of the pixel window over vertices adjacent the pixel of interest, rather than over the pixel itself, allows parallel interpolation in a single window to be performed. This is an improvement over the approach of centering the interpolation process over a single pixel to generate a single pixel output value. This may be particularly advantageous for interpolation to certain color space formats, such as 4:2:2 and 4:2:0 YCbCr, which generate color data for 1×2 and 2×2 pixel windows, respectively.

Referring now to FIGS. 11A-11D, vertex-based interpolation for various sampling formats is illustrated, all illustrated with a 2×2 Bayer color filter pattern. The ability to change the size of the pixel window as well as to change the location and number of virtual pixels (vertices) used, makes vertex-based interpolation a very powerful tool, particularly when combined with conversion in the acquisition and processing chain. Referring now to FIG. 11A, the 3×3 pixel window centered over the 2×2 Bayer RGB color filter pattern, described at length above, is shown. For YCbCr interpolation, four Y values can be easily interpolated at each vertex a, b, c, and d. In FIG. 11B, The window may be reduced in size to be a 2×3 size in which only two vertices are needed to computer the upper Cb and Cr for a 4:2:2 format. In FIG. 11C, the window may again be sized to 2×3 but to define different virtual pixels to facilitate computation of the lower Cb and Cr values for 4:2:2. Finally, in FIG. 11D, the same size and placement of the pixel window as in FIG. 11A is used, but this time only two virtual pixels, placed on either side of the pixel of interest G5 are needed to compute single Cb and Cr values for a 4:2:0 format.

Figure 12B:
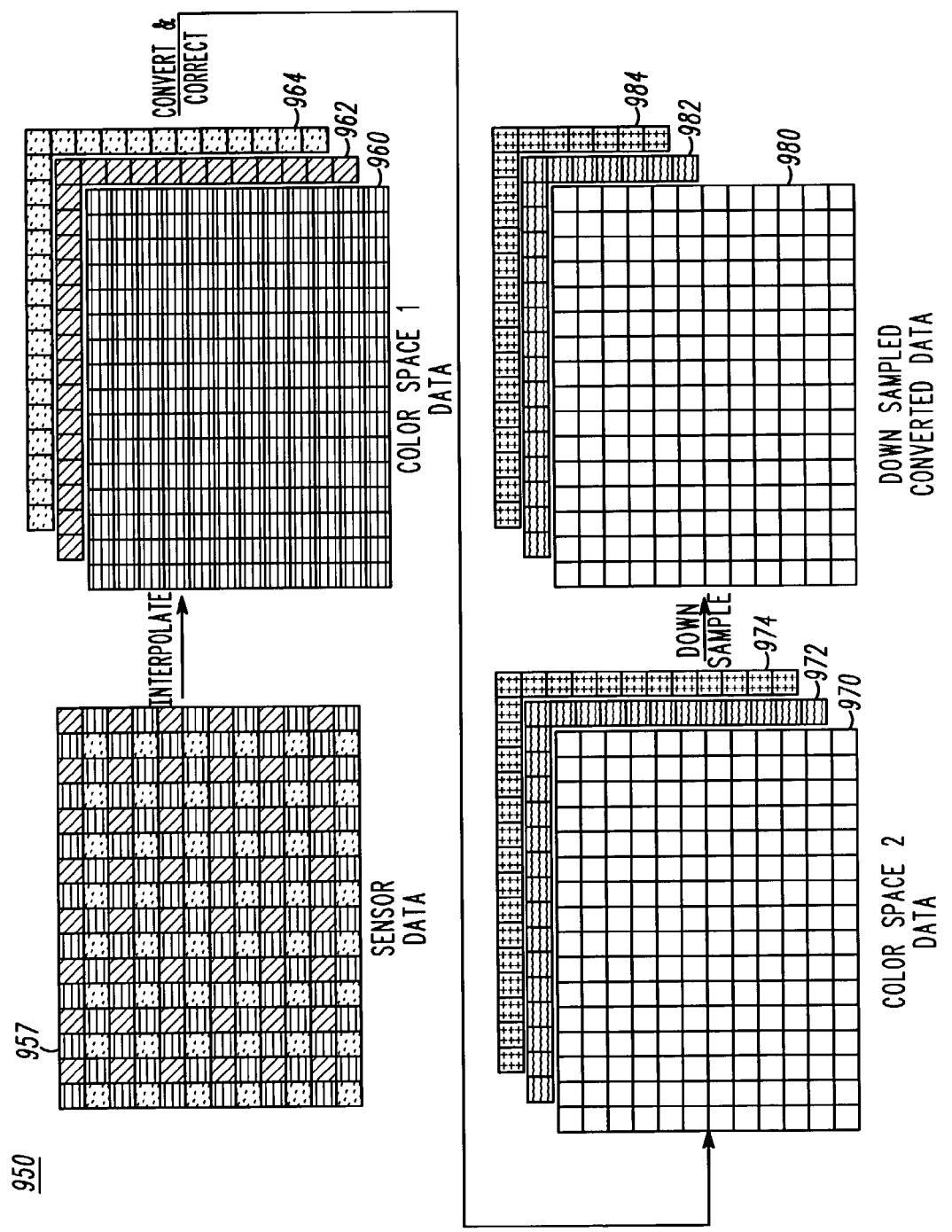
FIG. 12B is a color space flow consistent with FIG. 12A.

As earlier noted, the vertex-based interpolation described at length above can be used, by itself, to improve a traditional image acquisition and processing chain in which the interpolation and conversion portions of the process are not combined. This is shown in FIGS. 12A and 12B. Referring now to the flow 900 of FIG. 12A, raw sensor data 910 is provided for vertex-centered interpolation to the color planes of a first color space at Block 912. The interpolated color data is next color corrected in accordance with a color correction matrix 916 at block 914, followed by gamma correction of the data at 918. At block 920, conversion of the data from color space one to color space two in accordance with conversion matrix 922 occurs. The converted color space two data may be decimated if desired at block 924. The output color data values 926 are generated by flow 900.

FIG. 12B illustrates a color space flow 950 defined by the functional flow 900. Raw sensor color data 955, such as CFA data, is interpolated using vertex-centering to produce planes 960, 962, 964 of color data in a first color space. Next, color and gamma correction, as well as conversion from color space 1 to color space 2 generates planes of color data 970, 972, 974 in the second color space as shown. Optionally, the color space 2 data may be down-sampled to produce the desired format of planar color data 980, 982, 984.

Figure 13:
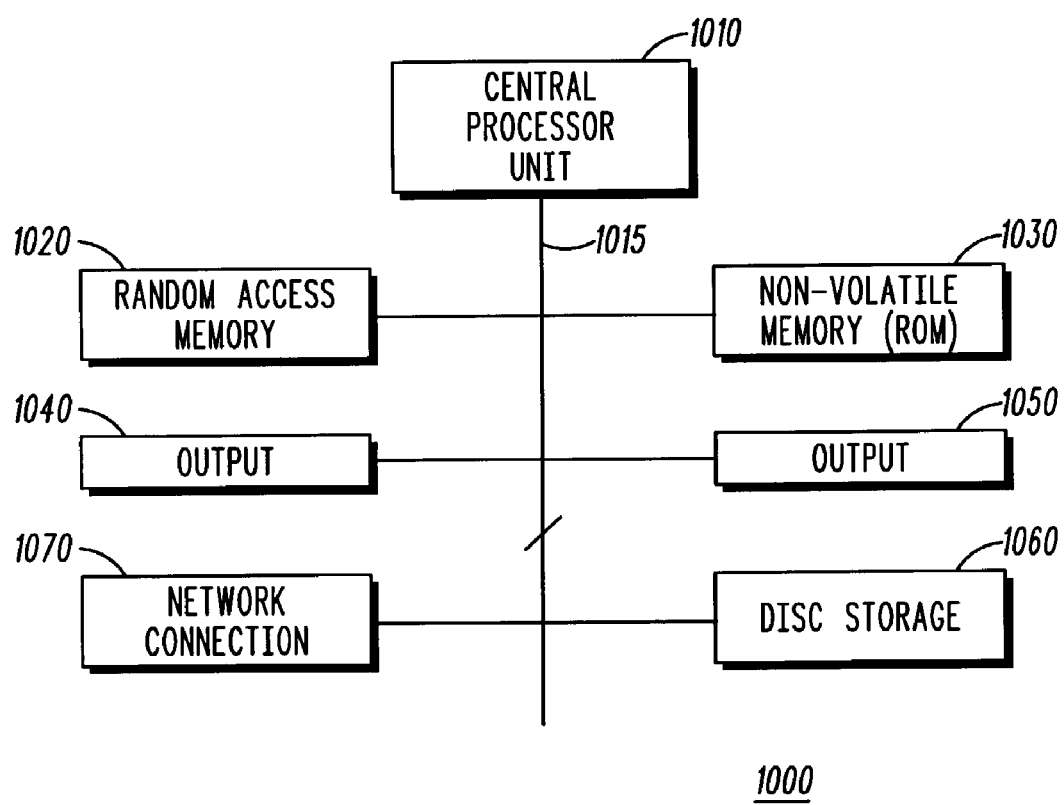
FIG. 13 is a block diagram of a computer system suitable for carrying out processes consistent with certain embodiments of the present invention.

The present invention is applicable to any device or environment in which color images are created from single plane raw sensor data input, whether the raw sensor data is from still images or video stream. Examples of such devices would include, but are not limited to, videophones, digital cameras, and camcorders. The processes previously described can be carried out of a programmed general-purpose computer system, such as the exemplary computer system 1000 depicted in FIG. 13. Computer system 1000 has a central processor unit (CPU) 1010 with an associated bus 1015 used to connect the central processor unit 1010 to Random Access Memory (RAM) 1020 and/or non-volatile memory 1030 in a known manner. An output mechanism at 1040 may be provided in order to display and/or print output for the computer user. Computer 1000 also may have disc storage 1060 for storing large amounts of information including, but not limited to, program files and data files. Computer system 1000 may be coupled to a local area network (LAN) and/or wide area network (WAN) and/or the Internet using a network connection 1070 such as an Ethernet adapter coupling computer system 1000, possibly through a firewall.

Those skilled in the art will recognize that the present invention has been described in terms of exemplary embodiments based upon use of algorithm. The interpolation technique of the present invention, as well as the image acquisition and processing method, may be implemented as an algorithm in either hardware or software. To implement in hardware, the algorithm may be instructions implemented in one or more application specific integrated circuits (ASICs) or digital signal processors (DSPs). The present invention could be implemented using hardware component equivalents such as special purpose hardware and/or dedicated processors that are equivalents to the invention as described and claimed. Similarly, general purpose computers, microprocessor based computers, micro-controllers, optical computers, analog computers, dedicated processors and/or dedicated hard wired or reconfigurable logic may be used to construct alternative equivalent embodiments of the present invention.

Those skilled in the art will appreciate that the program steps and associated data used to implement the embodiments described above can be implemented using any suitable electronic storage medium such as disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of color image processing, comprising:
    interpolating and converting color data in a first color space directly to a second color space in accordance with a conversion matrix, wherein interpolating and converting the color data further comprises converting the interpolated color data to the second color space in accordance with a simplified conversion matrix not requiring multiplier logic to be implemented; and
    performing color correction of the color data in the second color space to generate output color data, wherein performing color correction of the color data further comprises performing color correction of the color data in accordance with a compensation matrix operable to correct for error introduced during conversion in accordance with the simplified conversion matrix.

2. The method of claim 1, wherein prior to interpolating and converting the color data in the first color space, further comprising:
    performing gamma correction of pixel sensor data to generate the color data in the first color space.

3. The method of claim 1, further comprising:
    outputting the output color data for display on a display mechanism.

4. The method of claim 1, further comprising:
    down-sampling the output color data to generate decimated output color data in the second color space.

5. The method of claim 1, further comprising after interpolating and convening the color data to the second color space and before performing color correction:
    performing pseudomedian filtering the color data in the second color space.

6. A computer readable medium carrying instructions that, when executed on a programmed processor, carry out a computer assisted method of color image processing according to claim 1.

7. The method of claim 1, wherein interpolating and converting the color data further comprises:
    performing vertex-based interpolation on pixel sensor data in the first color space.

8. The method of claim 7, wherein performing vertex-based interpolation further comprises:
    identifying a plurality of vertices arranged about a pixel in a color filter pattern, each vertex being located between the center of the pixel and the center of an adjacent pixel, but not at either center of pixel sensor data in the first color space, wherein the plurality of vertices define a corresponding plurality of virtual pixels;
    positioning a pixel window over the plurality of virtual pixels; and
    interpolating virtual pixel color data for each of the plurality of virtual pixels in accordance with a virtual pixel algorithm.

9. The method of claim 8, wherein the color pixel data for the plurality of virtual pixels is interpolated in parallel.

10. The method of claim 8, wherein the virtual pixel algorithm is defined at least partially by the color filter pattern.

11. The method of claim 8, further comprising repeating the identifying, positioning and interpolating for each pixel of a plurality of pixels of interest in the color filter pattern.

12. A method of vertex-based interpolation of color pixel data, comprising:

identifying a plurality of vertices arranged about a pixel in a color filter pattern, each vertex being located between the center of the pixel and the center of an adjacent pixel, but not at either center, wherein the plurality of vertices define a corresponding plurality of virtual pixels;

positioning a pixel window over the plurality of virtual pixels; and interpolating virtual pixel color data for each of the plurality of virtual pixels in accordance with a virtual pixel algorithm.

13. The method of claim 12, wherein the color pixel data for the plurality of virtual pixels is interpolated in parallel.

14. The method of claim 12, wherein the virtual pixel algorithm is defined at least partially by the color filter pattern.

15. The method of claim 12, further comprising repeating the identifying, positioning and interpolating for each pixel of a plurality of pixels of interest in the color filter pattern.

16. The method of claim 12, further comprising:
outputting the interpolated virtual pixel color data for display on a display mechanism.

17. A computer readable medium carrying instructions that, when executed on a programmed processor, carry out a computer assisted method of color image processing according to claim 12.

18. A device capable of acquiring and processing color images, comprising:
a processor;
an input for receiving pixel sensor data from one or more images; and
a program running on the processor that provides color imaging processing of the received pixel sensor data by:
interpolating and converting color data in a first color space directly to a second color space in accordance with a conversion matrix, wherein interpolating and converting the color data further comprises converting the interpolated color data to the second color space in accordance with a simplified conversion matrix not requiring multiplier logic to be implemented; and
performing color correction of the color data in the second color space to generate output color data, wherein performing color correction of the color data further comprises performing color correction of the color data in accordance with a compensation matrix operable to correct for error introduced during conversion in accordance with the simplified conversion matrix.

19. The device of claim 18, wherein prior to interpolating and converting the color data in the first color space, the program further comprising:
performing gamma correction of pixel sensor data to generate the color data in the first color space.

20. The device of claim 18, the program further comprising:
down-sampling the output color data to generate decimated output color data in the second color space.

21. The device of claim 18, wherein interpolating and converting by the program further comprises performing vertex-based interpolation by:
identifying a plurality of vertices arranged about a pixel in a color filter pattern, each vertex being located between the center of the pixel and the center of an adjacent pixel of pixel sensor data in the first color space, wherein the plurality of vertices define a corresponding plurality of virtual pixels;

positioning a pixel window over the plurality of virtual pixels; and interpolating virtual pixel color data for each of the plurality of virtual pixels in accordance with a virtual pixel algorithm.

22. A device capable of acquiring and processing color images, comprising:
a processor;
an input for receiving pixel sensor data from one or more images; and
a program running on the processor that provides vertex-based interpolation of color pixel data by:
identifying a plurality of vertices arranged about a pixel in a color filter pattern, each vertex being located between the center of the pixel and the center of an adjacent pixel, wherein the plurality of vertices define a corresponding plurality of virtual pixels;
positioning a pixel window over the plurality of virtual pixels; and
interpolating virtual pixel color data for each of the plurality of virtual pixels in accordance with a virtual pixel algorithm.

23. The device of claim 22, further comprising repeating the identifying, positioning and interpolating for each pixel of a plurality of pixels of interest in the color filter pattern.

24. A method of vertex-based interpolation of color pixel data, comprising:
identifying a plurality of vertices arranged about a pixel in a color filter pattern of a first color space, each vertex being located equidistant between the center of the pixel and the center of a corner adjacent pixel, wherein the plurality of vertices define a corresponding plurality of virtual pixels;
positioning a pixel window over the plurality of virtual pixels; and
interpolating virtual pixel color data for each of the plurality of virtual pixels in accordance with a virtual pixel algorithm, wherein the virtual pixel algorithm generates three color values in a second color space using color data of pixels adjacent to the virtual pixel.

25. A method of vertex-based interpolation of color pixel data, comprising:
identifying a plurality of vertices arranged about a pixel in a color filter pattern in a first color space, each vertex being located at a boundary of the pixel and an adjacent pixel, wherein the plurality of vertices define a corresponding plurality of virtual pixels;
positioning a pixel window over the plurality of virtual pixels; and
interpolating virtual pixel color data for each of the plurality of virtual pixels in accordance with a virtual pixel algorithm, wherein the virtual pixel algorithm generates three color values for each of the virtual pixels in one of the first color space and a second color space.

* * * * *